United States Patent [19]

Marietta

[11] Patent Number: 5,406,607
[45] Date of Patent: Apr. 11, 1995

[54] APPARATUS, SYSTEMS AND METHODS FOR ADDRESSING ELECTRONIC MEMORIES

[75] Inventor: Bryan D. Marietta, Dallas, Tex.

[73] Assignee: Convex Computer Corporation, Richardson, Tex.

[21] Appl. No.: 201,009

[22] Filed: Feb. 24, 1994

[51] Int. Cl.6 .................. H03K 17/00; H04Q 3/12
[52] U.S. Cl. .................. 377/64; 340/825.79; 370/112; 327/407
[58] Field of Search ............. 377/64, 75, 70; 328/104; 340/825.79; 370/112

[56] References Cited

U.S. PATENT DOCUMENTS

| | | | |
|---|---|---|---|
| 3,657,658 | 4/1972 | Kubo | 328/104 |
| 3,832,690 | 8/1974 | McVoy et al. | 328/104 |
| 4,667,320 | 5/1987 | Onno et al. | 340/825.79 |
| 4,965,797 | 10/1990 | Yumane et al. | 370/112 |
| 5,159,278 | 10/1992 | Mattison | 328/104 |
| 5,325,089 | 6/1994 | Goeldner | 340/825.79 |
| 5,331,222 | 7/1994 | Lin et al. | 328/104 |

Primary Examiner—John S. Heyman
Attorney, Agent, or Firm—Winstead Sechrest & Minick

[57] ABSTRACT

A circuit is disclosed for reducing the number of signal lines passing through a connector (205) comprised of a shift register coupled to a plurality of input data lines and half as many output data lines. When a load signal is received, the shift register latches the data from the input data lines and immediately transmits half of the data to the output data lines and through the connector. When the shift register receives a shift signal, the other half of the data is shifted onto the same output lines and pass through the connector to achieve a two-to-one multiplexing function.

18 Claims, 4 Drawing Sheets

APPARATUS, SYSTEMS AND METHODS FOR ADDRESSING ELECTRONIC MEMORIES

TECHNICAL FIELD OF THE INVENTION

The present invention relates to processing systems and in particular to apparatus, systems, and methods for addressing electronic memories.

BACKGROUND OF THE INVENTION

High performance processor systems containing multiple circuit boards frequently encounter system performance problems at high speed due to electrical noise and cross-talk generated by signals passing through the board connectors. The longer signal lines are and the closer they get to one another, the worse the noise and cross-talk problems become. It is therefore a good design practice to minimize the number of signals lines that are sent through a connector between circuit boards. A reduced number of signals passing through a connector containing a given number of pins allows the high speed switching signals to be spaced further apart within the connector, thereby reducing the amount of cross-talk between the lines.

Additionally, the reduction in signals passing through the connector creates unused connector pins that may now be used as ground connections to couple the ground planes of the circuit boards, thereby reducing drift in the ground planes towards the power supply. Alternatively, in systems where cross-talk and noise are not significant problems, reducing the number of signals passing through the connector is still a desirable goal because the reduction in pins required allows for smaller connectors to be used, thereby saving valuable board space.

One instance where the reduction of signals lines becomes important in a high performance processor system is the connection between a memory motherboard and its RAM daughterboards. Typically, high performance computers have large memory address and data buses that operate at high speed. It is particularly desirable to reduce the large number of bus signal lines that pass through the connector since typically the signal lines that comprise the address and data buses are in close proximity when they pass through the connectors from the motherboard to the daughterboards, which results in greatly increased cross-talk. Furthermore, if the memory chips and their control circuitry are on different cards, the number of control signals passing through the connector leads to additional noise problems. Therefore, it is a further desirable goal to reduce the number of control signals passing through the connectors.

Thus, a need has arisen for apparatus, systems, and methods for minimizing the number of signals being passed through a connector. Furthermore, a need has arisen for apparatus, systems, and methods providing flexible memory controls which allow for the use of memory devices of varying performance parameters in a single design while minimizing the amount of control hardware required.

SUMMARY OF THE INVENTION

It is possible to reduce the required number of address lines passing through a connector in computer memories that use RAM chips which read each address in two sequential halves, such as dynamic RAMS (or DRAMs). In DRAM chips, the address is split in two and multiplexed onto half the number of pins. The first half of the address received by the DRAM chip is the "row address" which is loaded by the "row address strobe" (RAS) signal. The second half of the address received by the DRAM chip is the "column address", which is loaded by the "column address strobe" (CAS) signal. This "RAS before CAS" scheme is the most common, although some RAM chips use a "CAS before RAS" scheme.

In the high speed computer of the present invention, the address lines and some control lines to the DRAM memory daughterboards are multiplexed onto half as many lines by a loadable shift register that performs the 2 to 1 mux function immediately before the connector interface. All of the address and control signal data is loaded into the shift register on the same clock edge. The first half of this data (Row data) is immediately sent through the connector to the DRAM board. The second half of the data (Column data) is sent when the shift register receives a SHIFT command that moves all the data one bit, which puts the second half of the data onto the same connector pins of the motherboard that the Row data has previously been on.

Alternative schemes could have been used to achieve the signal line reduction, the most obvious of which would be a 2 to 1 multiplexer (MUX). However, board space limitations, pre-existing system requirements that necessitated the latching of row and column data in a register on the motherboard, and propagation delays created by additional MUXes made such other schemes inferior to the present invention. The drawbacks of an alternative MUXing arrangement will be discussed in greater detail below.

BRIEF DESCRIPTION OF THE DRAWINGS

For a more complete understanding of the present invention, and the advantages thereof, reference is now made to the following descriptions taken in conjunction with the accompanying drawings in which.

DETAILED DESCRIPTION OF THE INVENTION

The principles of the present invention and their advantages are best understood by referring to the illustrated embodiments depicted in FIGS. 1-4 of the drawings, in which like numbers designate like parts.

Figure 1:
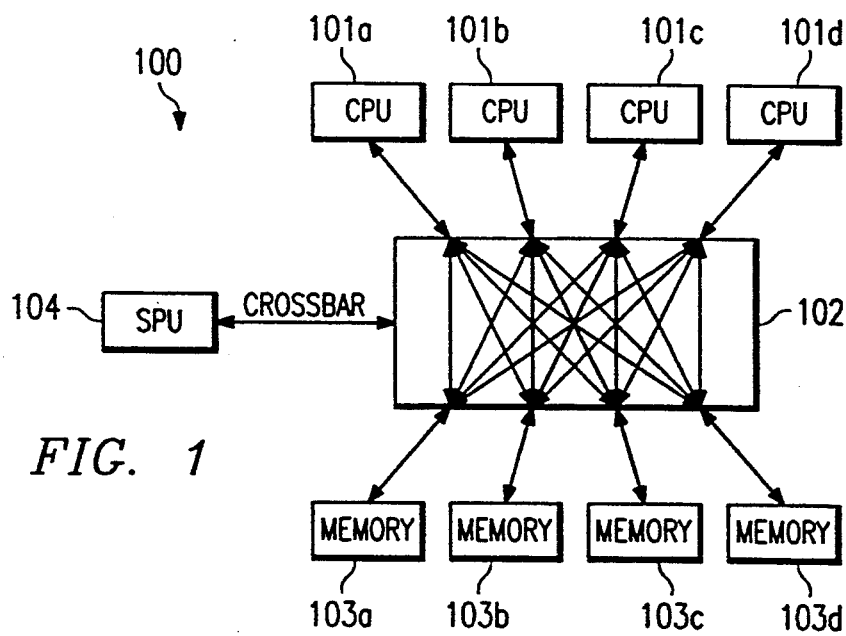
FIG. 1 is a functional block diagram of the high speed computer which embodies the present invention.

FIG. 1 is a functional block diagram of a processing system 100 according to one embodiment of the present invention. Processing system 100 includes a series of parallel central processing units 101a–101d, a crossbar 102, a series of parallel memory units 103a–103d, and a service processor 104. In the illustrated embodiment, each central processing unit 101 is a vector processor. Crossbar 102 allows for the selective interconnection of a given one of the central processing units 101 with a given one of the memory units 103. In the illustrated embodiment, crossbar 102 is memory address selective, and each memory unit 103 accommodates a different address range for the storage and retrieval of data. If a given CPU 101 requires the performance of a memory operation, that CPU 101 provides instructions designating a desired operating address space and crossbar 102 analyzes the instructions from the given CPU 101 and then controls the transfer of data to and from the corresponding memory unit 103. Service processor 104 handles such functions as system initialization and fault detection/isolation.

Figure 2:
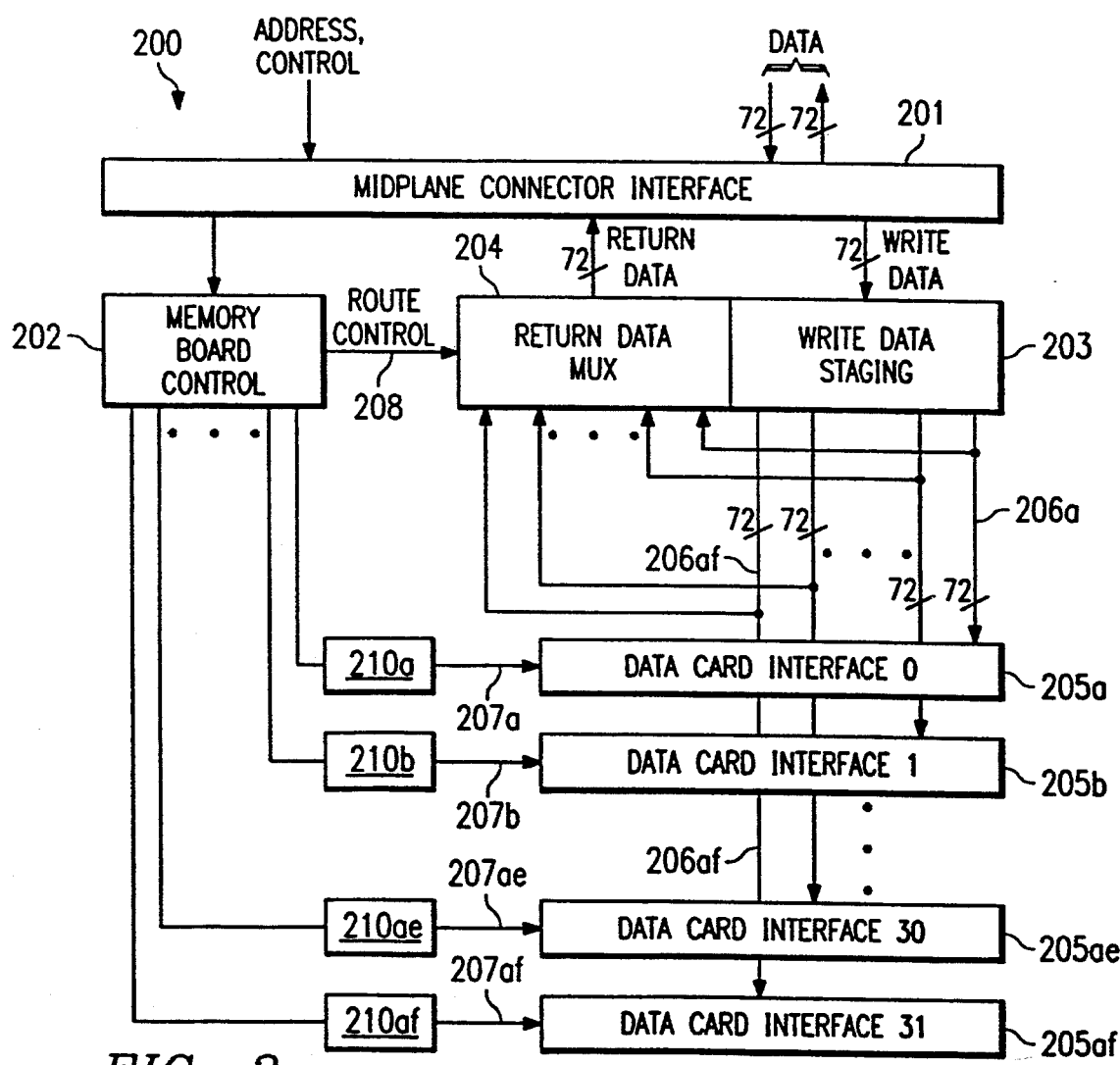
FIG. 2 is a functional block diagram of one of the memory motherboards depicted in FIG. 1.

FIG. 2 is a detailed functional block diagram of the memory board (motherboard) 200, a selected one of the memory units 103a–103d. Memory board 200 includes a midplane connector interface 201 for receiving data, addresses, and control signals from crossbar 102. In the illustrated embodiment, data is received as 72-bit words which are composed of eight 8-bit data bytes and eight corresponding parity bits (one parity bit per byte of data). Address and control signals from crossbar 102 are routed to memory board control circuitry 202 via midplane connector 201. Data being routed to and from cross-bar 102 through midplane connector 201 are controlled by write staging circuitry 203 and return data multiplexer 204. Each memory board 200 also includes thirty-two (32) interface units 205 for receiving data cards (daughterboards or cards) (not shown). Each data card interface 205 is coupled to write data staging circuitry 203 and read data multiplexing circuitry 204 via a respective 72-bit bidirectional bus 206. Thus, in the illustrated embodiment where thirty-two data card interfaces 205 (and correspondingly thirty-two data cards) are employed, there are accordingly thirty-two 72-bit bidirectional data buses 206a–206af (a total of 2304 separate lines).

Memory control circuitry 202 is coupled to return data multiplexing circuitry 204 and write data staging circuitry 203 via a bus 208. Memory board control circuitry 202 handles data requests from a given CPU 101 as directed via crossbar 102. Memory board controller 202 then provides the appropriate addresses and control signals to the selected memory card to perform a write into the data card through the associated data card interface 205 using write data staging circuitry 203, a read from the selected memory card through the corresponding data card interface 205 using return data multiplexing circuitry 204, or a read-modify-write.

It is important to note that in the illustrated embodiment, crossbar 102 and each memory card inserted in a corresponding data card interface 205 are provided with parity checking capability such that errors can be detected and reported at both crossbar 102 and each data card.

In addition to the 72 data/data parity bus pins that pass through each data card interface 205 to a DRAM daughterboard, there are also address lines, zone lines, and zone and address parity lines. To minimize the number of signal lines passing through each connector, a 2 to 1 multiplexing of these lines is performed immediately before the data card interface connector. In the present invention, the signal line reduction is accomplished by a bank of shift registers 210 for each DRAM daughterboard data interface 205. In the illustrated embodiment of system 100, row and column address data are simultaneously present on the motherboard in order to maintain high speed data flow. For the purposes of other functions in the computer, system 100 requires that the row and column addresses be latched into registers and scanned. In typical high performance design practice, the row and column address data would first be latched into shift registers. Then, the outputs of the registers containing row data of a certain bit significance would be applied to one of the input channels of a multiplexer (MUX) and column data of the same bit significance would be applied to the other channel of the MUX. Row data would be sent to the DRAM card by selecting the MUX channel carrying the row data. Sometime later, the column data would be sent by selecting the channel carrying the column data. This method has the drawback of adding MUX chips to a motherboard where board space may already be critically short. Another drawback is that channel selecting circuitry must be added,. A still further drawback is that the additional layer of MUX chips on the address lines adds another set of gate delays to a system that is extremely sensitive to time delays. By interleaving the row and column data on the same registers and taking advantage of their shift functions, the need for the MUX chips is eliminated.

Figure 3A:
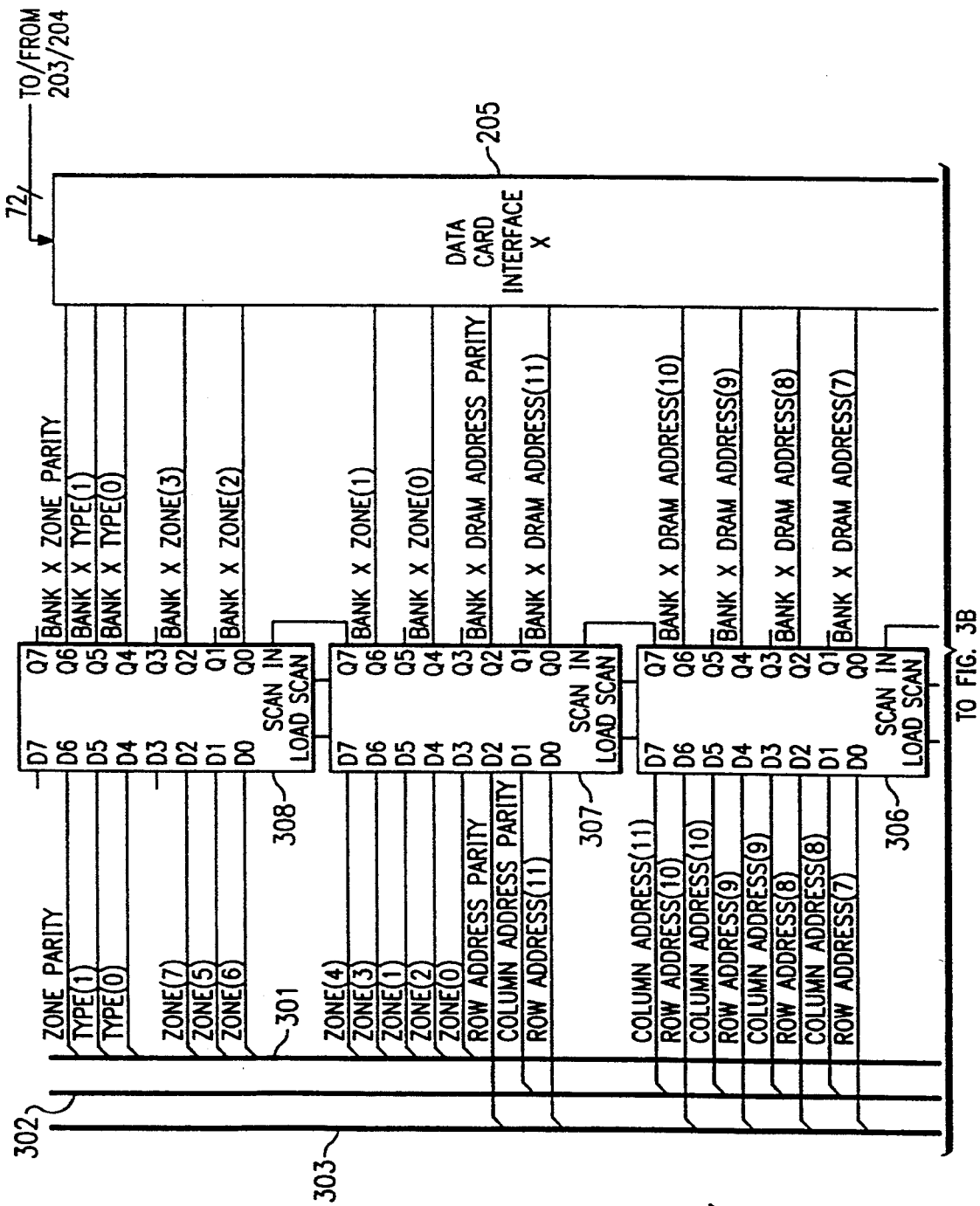
FIGS. 3a and 3b are an electrical schematic diagram of the shift register address circuitry depicted in FIG. 2.
Figure 3B:
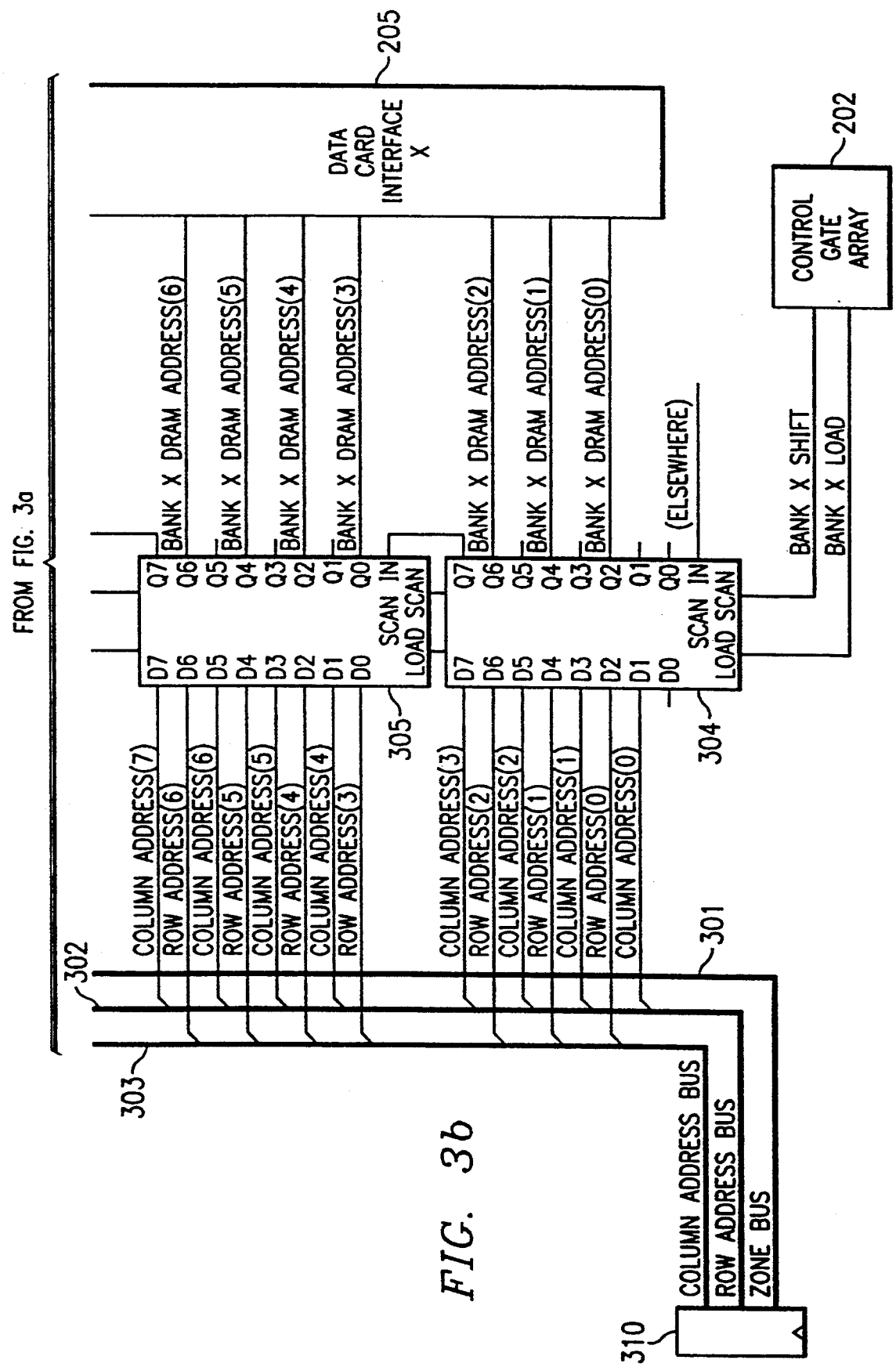

FIGS. 3a and 3b illustrate the signal line reduction scheme for a given one of the 32 DRAM memory cards inserted in a selected data card interface 205 of the memory motherboard 200. In FIGS. 3a and 3b, the Zone Address Bus 301, the Row Address Bus 302, and the Column Address Bus 303 are driven by data bus registers 310. In a preferred embodiment of the present invention, the data bus registers 310 are Eclipse 100E142 shift registers. Each motherboard 200 has four sets of such buses 301–303, each connected to eight memory card interfaces 205 and each carrying identical address and zone information. Between each set of buses 301–303 and the data card interface 205 are five shift registers 304–308 that multiplex the address, zone and control information onto half as many pins. In the preferred embodiment of the present invention, the shift registers 304–308 that multiplex the address, zone, and control data are Eclipse 100E241 shift registers.

Figure 4:
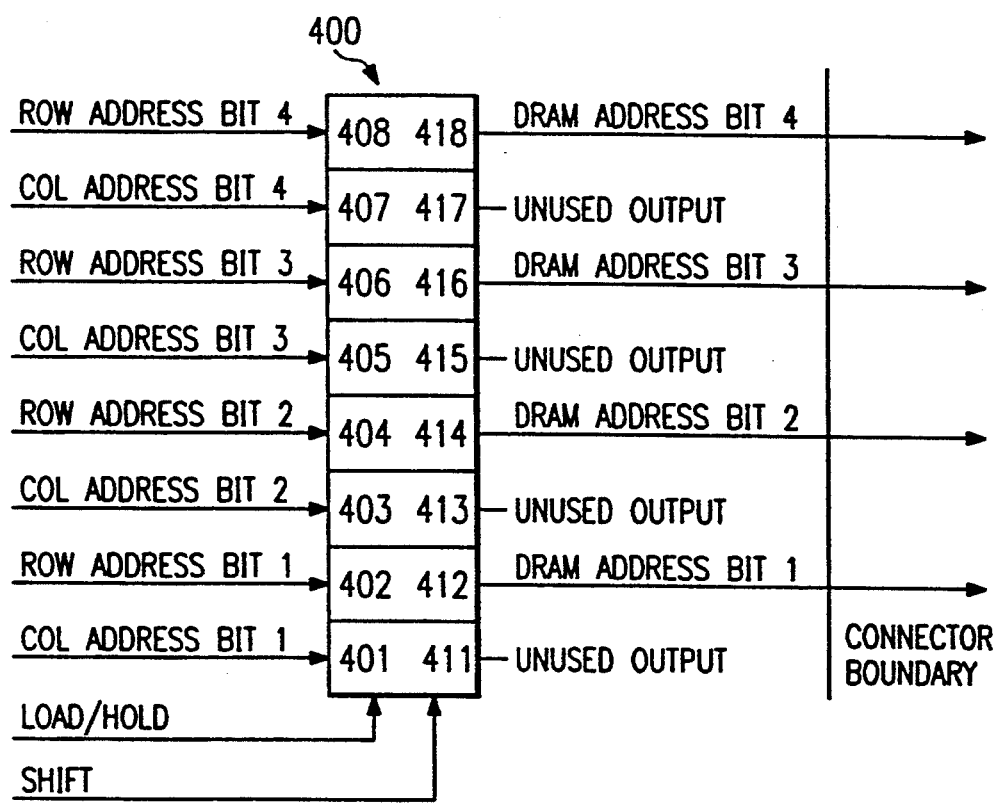
FIG. 4 is a functional diagram of a selected one of the shift registers depicted in FIGS. 3a and 3b.

FIG. 4 illustrates in simplified terms how a single shift register 400 would work to perform a 2 to 1 multiplexing. In FIG. 4, four row and four column bits are applied to the eight input pins 401–408 of the shift register 400. When the Load/Hold signal input is exercised, all eight of the address bits appear on the output pins of the shift register. The four column bits (0s or 1s) appear on the output pins 411, 413, 415 and 417 (labeled "unused output"). The four row address bits (0s or 1s) appear on the output lines 412, 414, 416 and 418 (labeled DRAM Address Bit 1 through DRAM Address Bit 4). The four row address bits immediately go through the connector 400 to the DRAM daughterboard. When the Shift signal is exercised, the four column address bits shift from the unused output pins 411, 413, 415 and 417 to the adjacent DRAM Address Bit output pin. The column address bits now go through the same connector pins to the DRAM board that the row address bits had previously been on. The row and column connections are made to the inputs 401–408 of the shift register 400 so as to preserve the significance of each bit in sequential order (i.e., Column Address Bit 1 and Row Address Bit 1 both appear on DRAM Address Bit 1, Column Address Bit 2 and Row Address Bit 2 both appear on DRAM Address Bit 2, etc.).

In FIGS. 3a and 3b, five shift registers 304–308 are cascaded together to multiplex the row address, column address, zone and type data. The four most significant zone bits, the zone parity bit, and the type bits are sent through shift register 308 to the connector 205. The four least significant zone bits, the most significant bit (MSB) of the row and column addresses (Bit 11), and the row and column address parity bits are sent through shift register 307. The second four most significant bits (Bits 7–10) of the row and column addresses are sent through shift register 306. The third four most significant bits (Bits 3–6) of the row and column addresses are sent through shift register 305. The three least significant bits (LSB) of the row and column addresses (Bits 0–2) are sent through shift register 304. The Zone Bus 301 contains bits that indicate which of the eight data bytes are to be written into the DRAMs on a read-modify-write cycle and which of the two data words are to be written on a write operation. The Row Address Bus 302 consists of 12 bits of row address. The Column Address Bus 303 consists of 12 bits of column address. As noted previously, in a preferred embodiment of the present invention, the Row Address, Column Address and Zone Buses are driven by Eclipse 100E142 shift registers 310 and originally are generated by the control gate array 300.

The load and shift signals are generated independently for each of the 32 DRAM cards. The load signal, Bank X Load, is asserted when the proper address is on the address buses 302, 303. The shift signal, Bank X Shift, is asserted when the second half of the address is required. In the names "Bank X Load" and "Bank X Shift", X is the number of the DRAM memory card. All registers shift on the same clock edge (clock connections are not shown). On each shift register 304–308, the row address and column address data are interleaved with one another so that address bits of the same significance (i.e., order of magnitude) are connected to adjacent input pins D0–D7. The row address data are connected to the even inputs D0, D2, D4, D6. The column address data are connected to the odd inputs D1, D3, D5, D7. When the load signal Bank X Load is applied to the shift registers 304–308, all of the data appear on the outputs Q0–Q7. However, only the even outputs Q0, Q2, Q4 and Q6 are connected to the DRAM daughterboard connector on the motherboard. Therefore, when the load signal is applied, only the row data, which initially appear on Q0, Q2, Q4, and Q6, pass through the DRAM card connector 205. When the signal Bank X Shift is applied to the shift registers 304–308, the column address data, which initially appear on the odd outputs Q1, Q3, Q5 and Q7, shift onto the even outputs Q0, Q2, Q4 and Q6 that were previously occupied by the row address data. The column address data bit which appears on the Q7 output is cascaded to the serial input pin (called Scan In) of the next shift register. When the signal Bank X Shift is applied to any shift register 304–308 the input data bit which appears on the Scan In input is shifted to the Q0 output.

In the illustrated embodiment, the Q7 output of each shift register 304–308 is cascaded to the Scan In input of the next register because the D0 input of the first shift register 304 is unused in the current configuration of the present invention. However, in alternative embodiments, the wiring scheme could have eliminated the cascading from Q7 to the Scan In input. For example, Column Address (0) through Column Address (3) could have been connected to the even inputs D0, D2, D4 and D6. Row Address (0) through Row Address (3) three could have been connected to the odd inputs D1, D3, D5 and D7 of the shift register. When the load signal, Bank X Load, is applied to the shift registers 304–308, all of the data would appear on the outputs Q0–Q7. However, this time the row address data would appear on the outputs Q1, Q3, Q5, and Q7. In such a case it would be necessary for the odd outputs Q1, Q3, Q5, and Q7 to be connected to the DRAM daughterboard connector on the motherboard. When the signal Bank X Shift is applied to the shift registers 304–308, the column address data, which would now appear on the even outputs Q0, Q2, Q4 and Q6, would shift onto the odd outputs Q1, Q3, Q5 and Q7 that were previously occupied by the row address data. Under this scheme, it would not be necessary to cascade the final column address bit from the Q7 output to the Scan In input of the succeeding shift register since all row and column address bits of the same significance would be inputted to pins on the same shift register.

What is claimed is:

1. A circuit for reducing the number of signal lines passing through a connector comprising:
   a plurality of input data signal lines;
   at least one output data signal line connected to said connector;
   a shift signal line;
   a load signal line; and
   a shift register having a plurality of data inputs, a plurality of data outputs, a shift input and a load input wherein at least two of said data inputs are coupled to at least two of said input data signal lines, at least one of said data outputs is coupled to at least one of said output data signal lines, said shift input is coupled to said shift signal line and said load input is coupled to said load signal line.

2. The circuit in claim 1 wherein a first of said data inputs receives a first bit of data from a first of said input data signal lines and a second of said data inputs receives a second bit of data from a second of said input data signal lines.

3. The circuit in claim 2 wherein said shift register transmits said first data bit from said first data input to a first of said data outputs and transmits said second data bit from said second data input to a second of said data outputs whenever said shift register receives a load signal from said load signal line on said load input.

4. The circuit in claim 3 wherein said shift register transmits said first data bit from said first data output to said second data output whenever said shift register receives a shift signal from said shift signal line on said shift input.

5. The circuit in claim 4 wherein said second data output is coupled to said output data signal line.

6. The circuit in claim 3 including a serial input signal line and wherein said shift register receives a serial input data bit from said serial input signal line on a serial input of said shift register which is coupled to said serial input signal line.

7. The circuit in claim 6 wherein said shift register transmits said first data bit from said first data output to said second data output and transmits said serial input data bit from said serial input of said shift register to said first data output whenever said shift register receives a shift signal from said shift signal line on said shift input.

8. The circuit in claim 7 wherein said first data output is coupled to said output data signal line.

9. The circuit in claim 7 wherein said shift register is called a "first shift register" and including a second shift register having a data output coupled to said serial input of said first shift register.

10. A circuit for reducing the number of signal lines passing through a connector comprising:
    eight input data signal lines;

four output data signal lines connected to said connector;

a shift signal line;

a load signal line; and a shift register having eight data inputs, eight data outputs, a shift input, and a load input, wherein at least two of said eight data inputs are coupled to at least two of said eight input data signal lines, at least one of said eight data outputs is coupled to at least one of said four output data signal lines, said shift input is coupled to said shift signal line and said load input is coupled to said load signal line.

11. The circuit in claim 10 wherein a first of said eight data inputs receives a first bit of data from a first of said eight input data signal lines and a second of said eight data inputs receives a second bit of data from a second of said eight input data signal lines.

12. The circuit in claim 11 wherein said shift register transmits said first data bit from said first data input to a first of said eight data outputs and transmits said second data bit from said second data input to a second of said eight data outputs whenever said shift register receives a load signal from said load signal line on said load input.

13. The circuit in claim 12 wherein said shift register transmits said first data bit from said first data output to said second data output whenever said shift register receives a shift signal from said shift signal line on said shift input.

14. The circuit in claim 13 wherein said second data output is coupled to a first of said at least one of said four output data signal lines.

15. The circuit in claim 12 including a serial input signal line and wherein said shift register receives a serial input data bit from said serial input signal line on a serial input of said shift register which is coupled to said serial input signal line.

16. The circuit in claim 15 wherein said shift register transmits said first data bit from said first data output to said second data output and transmits said serial input data bit from said serial input of said shift register to said first data output whenever said shift register receives a shift signal from said shift signal line on said shift input.

17. The circuit in claim 16 wherein said first data output is coupled to a first of said at least one of said four output data signal lines.

18. The circuit in claim 16 wherein said shift register is called a "first shift register" and including a second shift register having a data output coupled to said serial input of said first shift register.

* * * * *